Sept. 1, 1970 D. C. CLARK 3,526,403

GAME PLAY OUTCOME CALCULATOR

Filed Aug. 10, 1967 4 Sheets-Sheet 1

INVENTOR.

Dalton C. Clark

BY Hill, Sherman, Meroni, Gross & Simpson ATTORNEYS

GAME PLAY OUTCOME CALCULATOR

Filed Aug. 10, 1967 4 Sheets-Sheet 2

Fig. 2

21

| | | | | | | | | | | | | | | | | | | | | | | | | |
|---|---|---|---|---|---|---|---|---|---|---|---|---|---|---|---|---|---|---|---|---|---|---|---|---|
| A | DEF. TIME | OFF. -5 | OFF. -10 | 15 | 10 | -5 | 19 | 9 | 6 | 7 | 0 | -1 | 0 | 4 | 7 | No | Yes | 0 | 30 | 3 | 40 | 90 | OUT ON 5 | A |
| 2 | DEF. SIDES | DEF. 15 | DEF. -5 | 5 | 0 | 2 | 0 | -4 | 0 | -2 | 5 | -2 | 1 | 3 | -1 | No | No | 10 | FUMB. | 10 | 48 | 10 | 40 | 2 |
| 3 | OFF. SIDES | OFF. 11 | DEF. 10 | 20 | 7 | 5 | 9 | 5 | 3 | 1 | FUMB. | 7 | 3 | 1 | 10 | Yes | No | 0 | 20 | 30 | 50 | 15 | 45 | 3 |
| 4 | DEF. SIDES | OFF. 5 | OFF. -20 | 0 | -5 | 15 | 0 | T.D. | -2 | 6 | 3 | 6 | 2 | 5 | 0 | No | Yes | FUMB. | 35 | 10 | 35 | PENAL 30 | 51 | 4 |
| 5 | OFF. CLIP | DEF. 10 | OFF. -15 | 10 | 0 | -3 | PENAL -2 | 35 | 5 | 2 | -5 | 4 | 0 | 11 | FUMB. | No | No | 0 | 25 | 20 | 60 | 15 | 38 | 5 |
| 6 | DEF. ROUGH | DEF. 0 | T.D. | -1 | FUMB. | 20 | -10 | -5 | 8 | -1 | 9 | 5 | 1 | 15 | 7 | Yes | No | 0 | PENAL 20 | 15 | BLOCK | 25 | 44 | 6 |
| 7 | OFF. HOLD | | OFF. 0 | 0 | 1 | -6 | 15 | -1 | 0 | 3 | 6 | 1 | T.D. | -3 | T.D. | No | Yes | 10 | 35 | 0 | 40 | T.D. | 50 | 7 |
| 8 | OFF. SIDES | OFF. 15 | DEF. -9 | 30 | 5 | -3 | INTER CEPT | 12 | T.D. | 10 | 5 | -1 | 10 | -1 | -2 | No | No | 8 | 0 | 5 | 50 | 10 | 45 | 8 |
| 9 | OFF. SIDES | OFF. 0 | OFF. -5 | 10 | 3 | 0 | 8 | 3 | 0 | FUMB. | -3 | 0 | -2 | -2 | 15 | No | No | 4 | 0 | 35 | 45 | 20 | 40 | 9 |
| 10 | DEF. SIDES | DEF. 5 | DEF. -10 | 40 | 12 | 5 | T.D. | 5 | FUMB. | 3 | 3 | 2 | 5 | 0 | 1 | Yes | Yes | 5 | 20 | 60 | 35 | 5 | PENAL 35 | 10 |
| J | OFF. HANDS | OFF. 0 | DEF -20 | 0 | 11 | -3 | 10 | 0 | 0 | T.D. | 1 | FUMB. | -1 | T.D. | 4 | BLOCK | Yes | 3 | 0 | 25 | 30 | 15 | 45 | J |
| Q | DEF. ROUGH | DEF. 7 | OFF. -5 | T.D. | T.D. | -2 | -5 | -2 | 10 | 2 | -2 | -1 | 5 | 5 | 0 | No | No | 0 | 25 | 10 | 40 | 10 | 40 | Q |
| K | OFF. CLIP. | DEF. 10 | DEF. -5 | 0 | 5 | -4 | T.D. | 10 | PENAL 5 | 4 | 10 | 1 | 6 | 8 | 4 | Yes | Yes | 1 | 30 | 0 | 60 | 20 | 55 | K |
| JO. | OFF. TIME | OFF. 11 | OFF. -3 | 13 | 7 | 19 | 11 | -7 | 13 | 5 | 4 | 2 | 3 | 9 | 11 | No | Yes | 8 | 25 | 40 | 45 | 15 | 35 | JO. |

INVENTOR.

Dalton C. Clark

BY Hill, Sherman, Meroni, Gross & Simpson ATTORNEYS

FIG. 3

22

| | | | | | | | | | | | | | | | | | | | | | | | | |
|---|---|---|---|---|---|---|---|---|---|---|---|---|---|---|---|---|---|---|---|---|---|---|---|---|
| A | 15 | 5 | 50 | T.D. | 25 | 0 | Yes | No | -4 | -8 | 5 | 4 | 2 | 3 | 4 | 10 | 0 | 6 | 5 | -5 | DEF. 10 | DEF. 0 | DEF. SIDES | A |
| 2 | OUT 20 | 0 | 35 | 9 | 40 | 5 | Yes | Yes | 0 | -1 | 2 | PENAL -3 | 1 | 4 | -2 | 6 | 10 | -4 | 2 | -12 | DEF. 15 | DEF. 10 | OFF. CLIP | 2 |
| 3 | 35 | 10 | 30 | 5 | 35 | 0 | No | No | PENAL -5 | 0 | -2 | 0 | 1 | 0 | -2 | -4 | INTERCEPT | 0 | T.D. | 0 | OFF. -10 | OFF. -5 | DEF. P.FOUL | 3 |
| 4 | 40 | 18 | 40 | 10 | 15 | 10 | Yes | No | 4 | 2 | 7 | -2 | 0 | 5 | 10 | 0 | 5 | FUMB. | 0 | T.D. | DEF. 25 | OFF. -10 | OFF. HOLD | 4 |
| 5 | 45 | 25 | 60 | 0 | 20 | 0 | Yes | Yes | 10 | 6 | 1 | 5 | -3 | -1 | 20 | PENAL -10 | 0 | 1 | -1 | 5 | OFF. 0 | OFF. 0 | DEF. ROUGH | 5 |
| 6 | 50 | FUMB. | 55 | 20 | 50 | FUMB. | No | No | 2 | 1 | 0 | 8 | 5 | 9 | 5 | 40 | 15 | 10 | 10 | 5 | DEF. 0 | DEF. 5 | OFF. SIDES | 6 |
| 7 | 30 | 10 | OUT ON 5 | 15 | 25 | 0 | No | No | -1 | 0 | 4 | -1 | 1 | 4 | 12 | 5 | 20 | 8 | 20 | T.D. | OFF. 20 | OFF. -10 | OFF. MOTION | 7 |
| 8 | 40 | 20 | BLOCK | 5 | OUT ON 10 | 5 | Yes | Yes | FUMB. | 20 | 0 | 5 | 0 | PENAL 4 | 5 | FUMB. | 0 | 5 | 6 | -2 | DEF. -1 | DEF. T.D. | OFF. TIME | 8 |
| 9 | OUT ON 10 | 0 | 35 | 15 | 30 | 10 | No | No | T.D. | FUMB. | 1 | -2 | 5 | 4 | -2 | -2 | -12 | 15 | -2 | 0 | OFF. -15 | OFF. -1 | DEF. SIDES | 9 |
| 10 | OUT ON 35 | 15 | 45 | 20 | 35 | PENAL 15 | Yes | No | -2 | 2 | 5 | 9 | T.D. | -4 | 3 | 4 | -4 | PENAL 5 | 0 | -1 | DEF. 5 | DEF. 10 | OFF. CLIP | 10 |
| J | 45 | 30 | 40 | 30 | 45 | 0 | Yes | Yes | 8 | -3 | PENAL 5 | 5 | -3 | -2 | 14 | 40 | 5 | 0 | 5 | PENAL 10 | DEF. 10 | OFF. -4 | DEF. TIME | J |
| Q | 35 | 20 | 55 | FUMB. | 30 | 5 | No | No | 10 | -4 | 10 | 0 | 1 | 0 | 15 | 20 | 15 | 5 | 9 | 40 | OFF. 10 | DEF. 0 | OFF. SIDES | Q |
| K | 55 | 35 | PENAL 60 | 40 | 35 | 10 | Yes | No | 20 | PENAL -8 | 5 | 6 | -2 | 6 | -4 | -1 | 25 | 10 | 15 | 15 | DEF. PENAL | OFF. 0 | DEF. SIDES | K |
| JO. | 59 | 40 | 60 | 75 | BLOCK | 0 | No | Yes | 15 | T.D. | 15 | -5 | 20 | 10 | 40 | 25 | 35 | 15 | -5 | 10 | OFF. 0 | DEF. 10 | OFF. HOLD | JO. |

INVENTOR.

Dalton C. Clark

BY Hill, Sherman, Meroni, Gross & Simpson ATTORNEYS

Sept. 1, 1970 D. C. CLARK 3,526,403

GAME PLAY OUTCOME CALCULATOR

Filed Aug. 10, 1967 4 Sheets-Sheet 4

INVENTOR.

Dalton C. Clark

BY Hill, Sherman, Meroni, Gross & Simpson ATTORNEYS 3,526,403

GAME PLAY OUTCOME CALCULATOR

Dalton C. Clark, 218 Stanley St., Andalusia, Ala. 36420

Filed Aug. 10, 1967, Ser. No. 659,759
Int. Cl. A63f *7/08;* G06c *1/00*
U.S. Cl. 273—94 3 Claims

ABSTRACT OF THE DISCLOSURE

A game played according to the rules of the game of football with standard playing cards, a chart of possible plays, a chart of play results, and a miniature football field-board and a marker whereby a player chooses his play, draws a card and on the basis of the card drawn determines the results of his play and spots the marker on the miniature field in accordance with the results. The chart of play results is printed in a different color on each side, and the side used to determine the outcome of a particular play is that which matches the color of a card drawn from the standard deck of playing cards.

BACKGROUND OF THE INVENTION

Field of the invention

This invention relates to games played for amusement and more particularly to a novel type of simulated football game.

Description of the prior art

Simulated football games to be played for amusement are known to the art. However such prior art games have required either expensive apparatus or complicated sets of playing cards designed for use solely in playing the particular prior art simulated football games.

SUMMARY

The present invention provides for a simulated football game to be played according to the rules of football and which realistically duplicates the strategy and results of standard football. The game is interesting and fun both for those having little knowledge of the game of football as well as those who are well versed in the art of the game. Because standard rules of football are used in playing the games, either local high school college conference rules, or professional football rules, the game has the added advantage of being educational with respect to football: its rules, tactics, and results.

The game apparatus of the present invention includes a miniature football field having end zones, 5 and 10 yard lines, and individual yard markings. The board may be provided with a play marking piece, down and score indicating markers and 10 yard measuring devices. A Play Choice Chart and charts of Play Results are used in connection with each other to determine the movement of the marker on the miniature playing field. The relationship between the play chosen and the results of that play is determined by the drawing of a card from a standard deck of playing cards.

It is then an object of this invention to provide an educational and entertaining simulated football game utilizing a standard deck of playing cards;

It is a further object of this invention to provide an educational and entertaining, simulated football game wherein the results of each play are determined by the relationship between a card drawn from a standard deck of playing cards and a Play Result Chart;

It is further and a more specific object of this invention to provide an educational and entertaining simulated football game which can be played by both those having limited knowledge and those having extensive knowledge of the game of football which is played according to the standard rules of the game of football and which utilizes a standard deck of playing cards in connection with a choice of Play Charts and a Play Results Chart to determine the outcome of the game.

BRIEF DESCRIPTION OF THE DRAWINGS

FIG. 2 illustrates a Play Result Chart used in connection with this invention.

FIG. 3 illustrates a second Play Result Chart used in connection with this invention.

DESCRIPTION OF THE PREFERRED EMBODIMENTS

Figure 1:
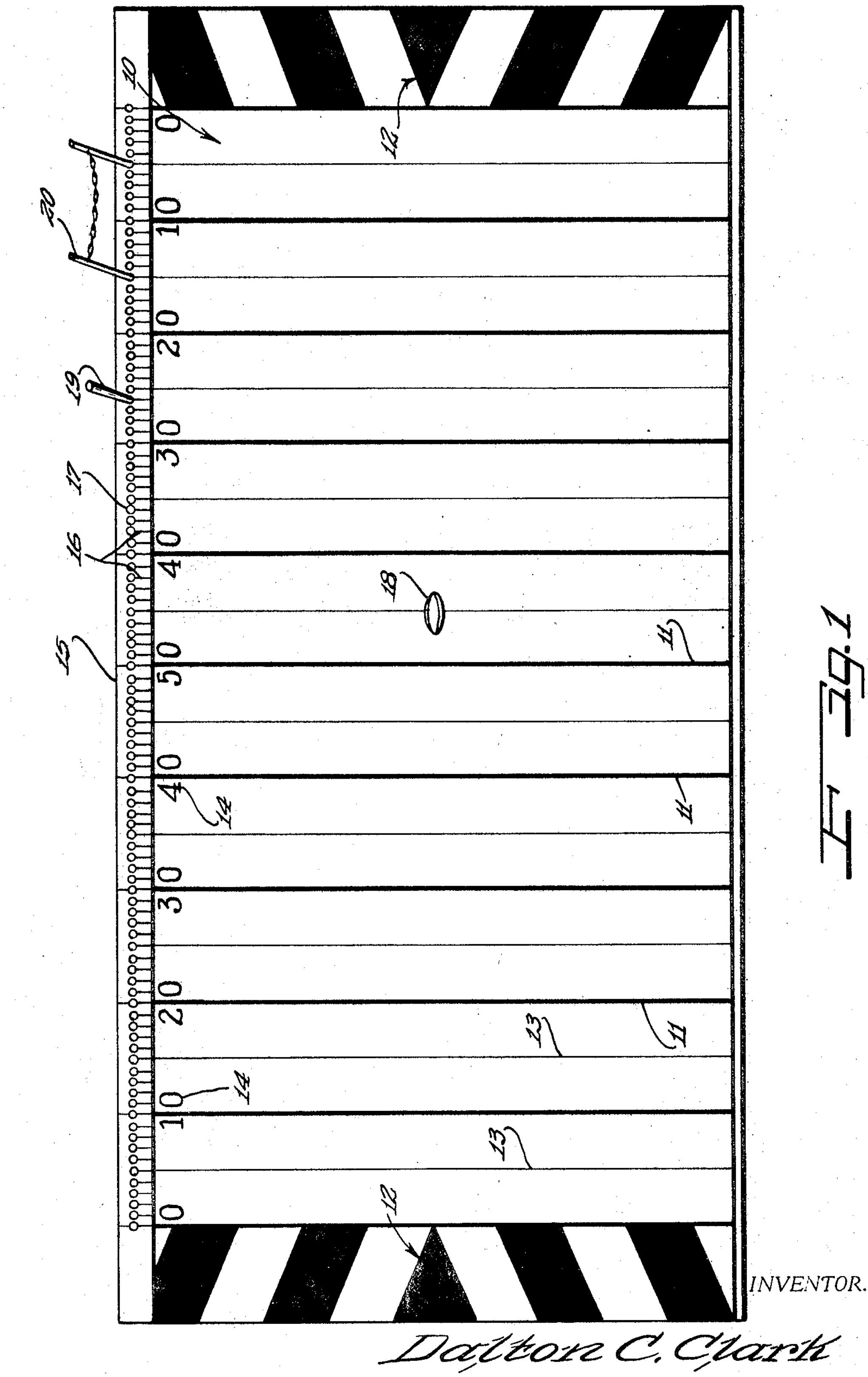
FIG. 1 illustrates a simulated football field game board as used in this invention.

As shown in FIG. 1 the game of this invention is played on a simulated miniature football field board 10 which has been divided to resemble a standard football field. Yard lines 11 are marked off to represent the 10 yard lines on a standard football field and shaded areas 12 are placed at either end of the field to represent end zone. Between each of the 10 yard lines 11 is a lighter line 13 representing the midpoint or 5 yard line between the 10 yard lines. The 10 yard lines 11 are designated along one boarder of the field by yard line numerals 14 which correspond to the markings of a standard football field.

Along the margin of one side 15 of the board 10 are individual yard line markers 16 representing the 100 yards to the playing field. The yard line marks 16 may have peg holes 17 associated therewith. A simulated football marker 18 is provided to indicate the spot on the playing field where play is to progress from. Marking pegs 19 may be placed in the pegged holes 17 to mark the exact yard position which has been designated generally by the playing marker 18. A 10 yard measuring marker 20 is provided to measure the distance the marker must be moved in four plays.

Figures 4, 5:
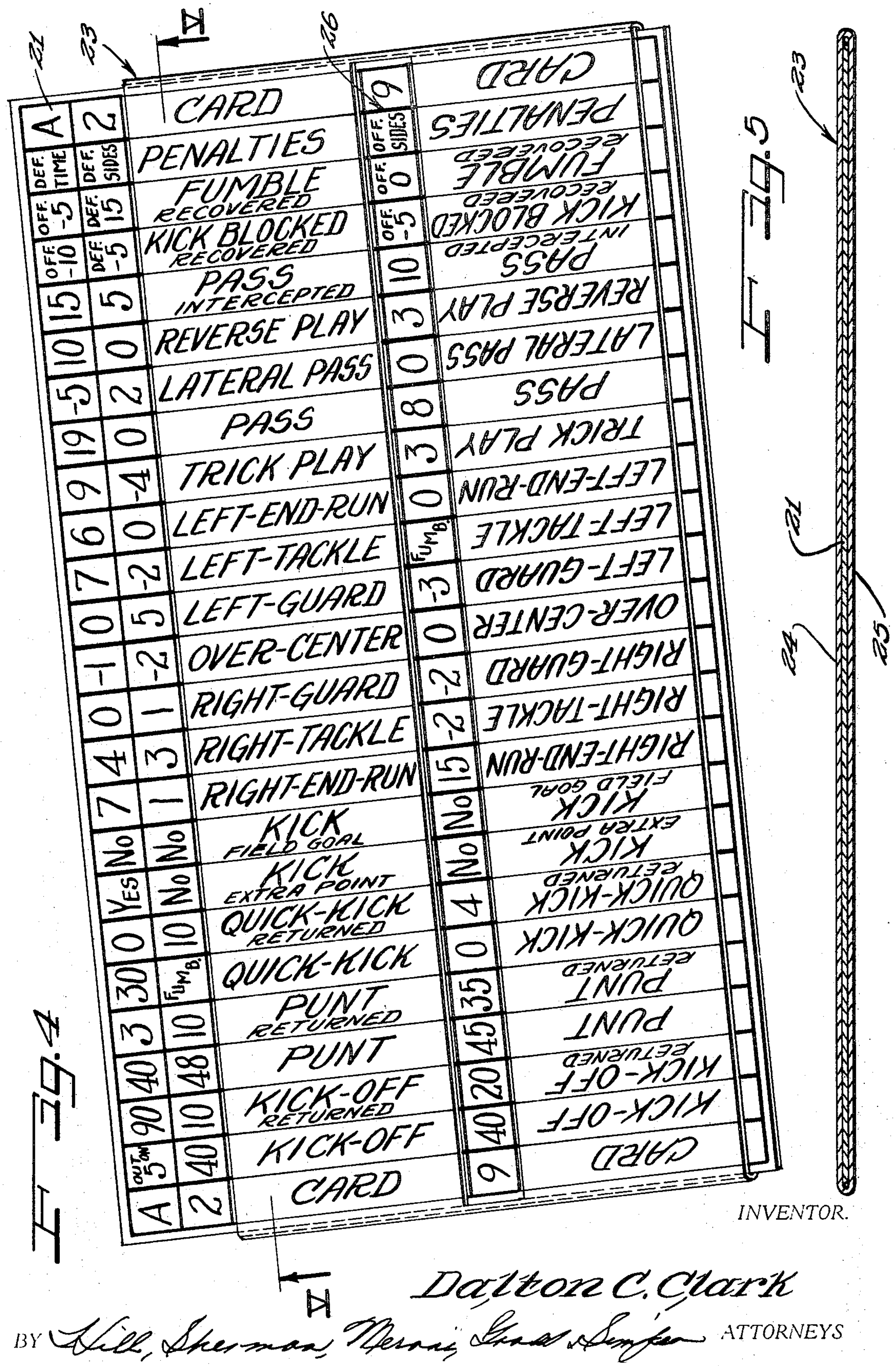
FIG. 4 illustrates the sleeve-like Play Choice Chart used in connection with this invention which is in position around the Play Result Chart.
FIG. 5 is a cross-sectional view of the Play Choice and Play Result Charts taken along the line V—V of FIG. 4.

The movement of the marker 18 is determined by the relationship between a card drawn from a standard deck of playing cards and Play Result Charts 21 shown in FIG. 2 and 22 shown in FIG. 3 and the Play Choice Chart 23 shown in FIG. 4. Two decks of standard playing cards are used, one for each half of a complete game. When the last card in the first deck has been drawn, the first half is over and the second half then begins. When the last card in the second deck has been drawn, the game is over. It is, of course, to be understood that a single deck of playing cards can be used and the deck reshuffled after the end of the first half.

The playing cards used are a standard deck of 52 cards with 2 jokers making 54 cards. In such a standard deck half of the cards are red and half of the cards are black. The writing on the two Play Result Cards 21 and 22 is also in different colors. The writing on the Play Result Card 21 is in red ink while the writing on the Play Result Card 22 is in black ink.

The different possible plays which a player may make are listed on the Play Choice Chart 23. As shown in FIG. 5, the Play Choice Chart 23 is constructed as a sleeve through which the play Result Charts 21 and 22 may be inserted. There are 25 ruled spaces across the width of the top 24 and bottom 25 outside faces of the Play Choice Chart 23. The center portion 26 of the top 24 and bottom 25 faces of the Play Choice Chart 23 is cut out across the width of the chart. The cut out center portions 26 provide windows through which can be read the printing on the Play Result Charts 21 and 22 which have been slipped into the sleeve-like Play Choice Chart 23.

Printed on either side of the cut out center strip 26 on both the top 24 and bottom 25 faces of the Play Choice Chart 23 in the 25 ruled spaces are various play options.

From one side to the other of the top face 24 of the Play Choice Chart 23 the ruled spaces contain the following printed designations: card, penalties, fumble recovered, kick blocked recovered, pass interception, reverse play, lateral pass, pass, trick play, left end run, left tackle, left guard, over center, right guard, right tackle, right end run, kick field goal, kick extra point, quick kick returned, quick kick, punt returned, punt, kick off returned, kick off, and card. The ruled spaces on the bottom face 25 of the Play Choice Chart 23 read the same as the ruled spaces on the top face 24. The top face 24 lettering is printed in red ink while the bottom face 25 lettering is printed in black ink.

The Play Result Charts 21 and 22 have 25 columns across the width of the chart and 14 columns from top to bottom of the charts. The columns intersect providing 350 squares. The first and last columns at either side of the width of the Play Result Charts 21 and 22 have listed from the top to the bottom thereof the designations for the 14 different types of cards found in a standard deck of 54 playing cards. The designation at the top is a capital letter A signifying an ace and the column reads from the ace through the king plus the letters JO at the bottom of the column which signify the joker. The squares created by the intersection of the remaining 23 columns across the width of the charts 21 and 22 and the 14 columns from top to bottom of the charts 21 and 22 contain printed designations of various play results. It can therefore be seen that each of the charts 21 and 22 contains 322 various play results.

In the preferred embodiment the charts 21 and 22 are printed on opposite sides of a single sheet which may be for example of heavy paper, cardboard, plastic or the like material and is free to slide therein. The 25 ruled spaces across the width of the Play Choice Chart 23 are aligned with the 25 columns across the width of the Play Result Charts 21 and 22 so that the printed choices on the Play Choice Chart 23 line up with the 25 columns of the Play Result Charts 21 and 22 when the same are received in the sleeve-like Play Choice Chart 23 as is illustrated in FIG. 4. When the sheet containing the charts 21 and 22 printed thereon is inserted into the sleeve-like Play Choice Chart 23, it is inserted so that the side containing the chart 21 which is printed in red is on the same side as is the face of the Play Choice Chart 23 which is printed in red. In this manner when the combined unit is assembled, one side thereof is printed in red and the other side thereof is printed in black.

The game is played between two players or two teams. At the beginning of play each player or team draws a card and the one with the highest card then elects to "kick off" or "receive." The player or team kicking off at the beginning of the game must receive at the start of the second half. Play is begun with the marker 18 placed at the 40 yard line of the side of the board that the player or team who kicks off has chosen to be his side of the "field."

The play for the kick off is illustrative of all of the plays and may be described as follows: the kicking player draws a card from the top of the deck and if the card is red he turns to the red printed side of the combination Play Choice and Play Result Charts unit and slides the two charts with respect to each other until the designation of the card which he has chosen can be seen through the cut out center section 26 of the Play Choice Chart 23 adjacent the printed designation "card." He then reads the information on the Play Results Chart which is adjacent to the designation "kick off" on the Play Choice Chart. The marker 18 is then moved in accordance with the results indicated on the Play Results Chart. For example as shown in FIG. 5, assuming the kicker had drawn a red nine from the top of the deck of playing cards, it can be seen that the results indicated from the combination Play Choice and Play Result card show that the marker should be moved 40 yards. The marker should then be moved to the 20 yard line on the other end of the playing field.

The receiving player must then draw a card to determine how far the kick off is to be returned. This is determined in the same manner as the determination of the kick off, that is, by sliding the Play Choice and Play Result Charts so that the playing card designation aligned with the printed word "card." The result is then read adjacent the words "kick off returned." For example in connection with FIG. 4 assumining that the receiving player had drawn a red nine it can be seen that the marker 18 is then to be moved 20 yards.

The play then proceeds in accordance with the rules of football, the players having 4 "downs" or "draws" in which to move the marker forward 10 yards. If the marker is moved forward 10 yards in 4 or fewer draws, the player then has four draws in which to move it at least 10 yards further. If the marker cannot be moved 10 yards in four draws, then at the end of the fourth draw, the opponent player then comes into possession of the marker and begins his draws.

Plays are made in accordance with the same method as was described in kick offs and kick off returns with the exception that the player must declare his play choice before drawing a card. The possible play choices are those which are listed on Play Choice Chart 23. For example, if the player elects to try a pass, and draws a black jack, he then takes the combination Play Choice and Play Result card, turns to the black side, slides the chart to the jack designation and looks under the "pass" heading. Under that heading the figures will denote the yardage gained or lost and the marker is then moved in accordance with that information. A negative figure on the Play Result Chart denotes yardage lost.

As can be seen from FIGS. 2 and 3, some of the information on the Play Results Charts is not indicative of yards gained or lost. When the letters "FUMB" appear at the play point, that is at the intersection, in the cut out section 26 of the card number designation and the play choice designation, it indicates that the ball has been fumbled. The word "penal" at the same point indicates that there has been a penalty on the play and the word "block" indicates that a kick has been blocked.

When a play results in a fumble according to the chart, the player draws another card to determine the results of the fumble, and uses the Play Choice and Play Result card to determine who recovered the fumble and the yardage gained or lost. This information is determined adjacent the strip containing the words "fumble recovered" the letters DEF indicating that the defense recovered the fumble and the letters OFF indicating that the offense recovered the fumble. The same procedure is followed with a blocked kick. The player immediately draws another card and looks at the corresponding column adjacent the "blocked kick recovered" designation to determine which side has recovered the blocked kick and the yards gained or lost.

If a player calls for a pass play and the indication on the play Results Chart is "intercept" it means that the pass has been intercepted by the opposition. The opposing team then has possess of the ball and draws a card to determine the results of the interception. The results of a pass interception are determined in the usual manner by checking the reading on the Play Result card for the appropriate card number adjacent the "pass interception" position.

The letters TD on the Play Result Charts indicates that the play has resulted in a touchdown for the team in possession of the ball at the beginning of the play. Of course, a touchdown is also scored when the team in possession of the marker has moved it across the opponents goal line as a result of the yardage gained on the play. When a touchdown is made, the team in possession automatically tries for the extra point. Any type of running or pass play may be called and if two or more yards are made on any of these plays, the point is good. If less than two yards are made, then the point is not good. If the player in possession chooses to kick for the extra point, the Play Result Chart adjacent the "kick extra point" position will determine whether or not the extra point has been made. The results are indicated by a "yes" or a "no."

Whenever a player is within the 30 yard line of the opponent's goal he may elect to attempt to kick a field goal. The results of such a play are determined in the usual manner by reading the appropriate play point adjacent the "kick field goal" position. The results are indicated by either the word yes or the word no which tells whether or not the field goal attempt was successful.

Some of the play results listed on the Play Result Charts indicate that a penalty has been incurred. When a penalty has been incurred another card is then drawn to determine which side incurred the penalty and what the penalty was. This is determined adjacent the "penalties" position and the results indicate that either the defense or the offense committed one of the penalties listed such as: off sides, clipping, personal foul, holding, roughing, illegal motion or, too much time. After the penalty has been determined the opposing team has the choice of electing whether to accept or decline the penalty. If the penalty is declined, the number of yards that the ball was moved on the play are indicated by small numbers underneath the word "penal" at the point where the play results were originally indicated. If the penalty is accepted, then the penalty yardage is determined by the rules of football which are being used by the players in the game.

After both decks of cards have been played through in the manner above indicated, the game is over and the player with the highest score wins.

It is to be understood that a simplified form of the game can be used in which the Play Choice Chart is absent and the various columns of the Play Result Charts have headings indicating the various play choices.

It can then be seen that the above described invention provides for an entertaining and educational simulated football game, which is played according to standard football rules and in which the play is determined by the interrelationship between Play Choice Charts, Play Result Charts, and a card drawn from a standard deck of playing cards.

Although various minor modifications might be suggested by those skilled in the art, it is to be understood that I wish to embody within the scope of my invention all such modifications.

I claim as my invention:

1. A simulated football game comprising: a standard deck of playing cards, half of which are printed in a first color and half of which are printed in a second color, a game board having lines thereon to resemble a football field, a position marker associated with said playing board for marking a playing position thereon, a first chart constructed as a sleeve having top and bottom outside surfaces, said top surface having printed indicia in said first color and said bottom surface having printed indicia thereon in said second color, said printed indicia including a columnar listing of possible plays which can be chosen, a second chart dimensioned to be received within said first chart, said second chart having top and bottom surfaces, said top surface having printed indicia thereon in said first color, said bottom surface having printed indicia thereon in said second color, said second chart slidably received within said first chart, said printed indicia on said second chart including a plurality of columnar displays of possible results of plays chosen, said plurality of columnar displays of said second chart designated with reference to numerical and letter indicia correponding to the indicia of the said standard deck of playing cards, said second chart slidable with respect to said first chart to align a given column of said second chart alongside the columnar display of said first chart in accordance with the numerical and letter indicia of a chance drawn card, and said second chart inserted in said first chart with the top side of said first chart readable in correspondent relation to the top side of said second chart and the bottom side of said first chart readable in corresponding relation to the bottom side of said second chart, whereby the color of the said chance-drawn card determines which side of the said first and said second charts shall determine the play and results.

2. The game of claim 1 wherein the said sleeve has cut-out central portions of said top and bottom surfaces, said cut-out portions effective to provide windows through which can be read the play result information on the top and bottom surfaces of the said second chart received through the said first chart.

3. A game comprising in combination: a standard deck of playing cards some of which are printed in a first color and some of which are printed in a second color, a play determining device, said play determining device including a first member having top and bottom spaced-apart sheets integrally connected by side walls at opposite edges thereof to define a sleeve having two closed side walls and two open ends, said sleeve having top and bottom outside surfaces, cut-out sections of said top and bottom sheets, said cut-out sections effective to define windows through said sheets, said windows extending substantially from side wall to side wall, a columnar listing of a plurality of possible play choices printed adjacent said window on the said surfaces, said top surface printed in said first color and said bottom surface printed in the said second color, a second member, said second member comprising a sheet having top and bottom surfaces, said sheet dimensioned to be received within the said sleeve extending substantially between the said side walls, said sheet dimensioned to extend beyond the said open ends of the said sleeve, the said sheet slidably received within the said sleeve, the said sheet containing a plurality of columnar listings of possible play results printed on the top and bottom surfaces thereof, the said top surface printed in the said first color and the said bottom surface printed in the said second color, the said plurality of columnar listings of the said sheet alignable with defined portions of the said columnar listings of the said sleeve whereby play results may be read through the said window from both the top and the bottom of the said sleeve, and the information displayed through the said window at the said top of the said sleeve different from the information displayed through the said window at the bottom of the said sleeve whereby play result is determined by the alpha numeric representation of a chance-drawn card and by the color of said card.

References Cited

UNITED STATES PATENTS

| | | | |
|---|---|---|---|
| 2,553,338 | 5/1951 | Shaw | 235—89 |
| 2,673,035 | 3/1954 | McTeer | 235—89 |
| 1,522,402 | 1/1925 | Wittkowski | 273—94 |
| 1,577,932 | 3/1926 | Palese | 273—94 |
| 1,584,141 | 5/1926 | Purnell | 273—94 |
| 2,044,506 | 6/1936 | Lundquist. | |

ANTON O. OECHSLE, Primary Examiner

P. E. SHAPIRO, Assistant Examiner

U.S. Cl. X.R.

235—89; 273—134